F. W. MEYER.
MEANS FOR PRODUCING ALTERNATING CURRENTS.
APPLICATION FILED MAR. 24, 1915.

1,264,420.

Patented Apr. 30, 1918.
2 SHEETS—SHEET 1.

WITNESSES:
Fred. A. Lind.
D. C. Davis.

INVENTOR
Friedrich W. Meyer
BY
Mosley G. Carr
ATTORNEY

F. W. MEYER.
MEANS FOR PRODUCING ALTERNATING CURRENTS.
APPLICATION FILED MAR. 24, 1915.

1,264,420.

Patented Apr. 30, 1918.
2 SHEETS—SHEET 2.

WITNESSES:
Fred A. Lind
D. C. Davis

INVENTOR
Friedrich W. Meyer
BY
Wesley G. Carr
ATTORNEY

UNITED STATES PATENT OFFICE.

FRIFDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

MEANS FOR PRODUCING ALTERNATING CURRENTS.

1,264,420. Specification of Letters Patent. Patented Apr. 30, 1918.

Application filed March 24, 1915. Serial No. 16,680.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Means for Producing Alternating Currents, of which the following is a specification.

My invention relates to systems of current distribution embodying inverted rectifiers of the vapor type, and it has for its object to provide an arrangement of the character specified whereby alternating currents of any desired number of phases and of any desired frequency may be derived from a unidirectional current source.

Another purpose of my invention is to provide a system of the character specified wherein the frequency of the current output may be readily varied and whereby it may be caused to synchronize with an alternating-current system deriving energy from other sources.

Figure 1:
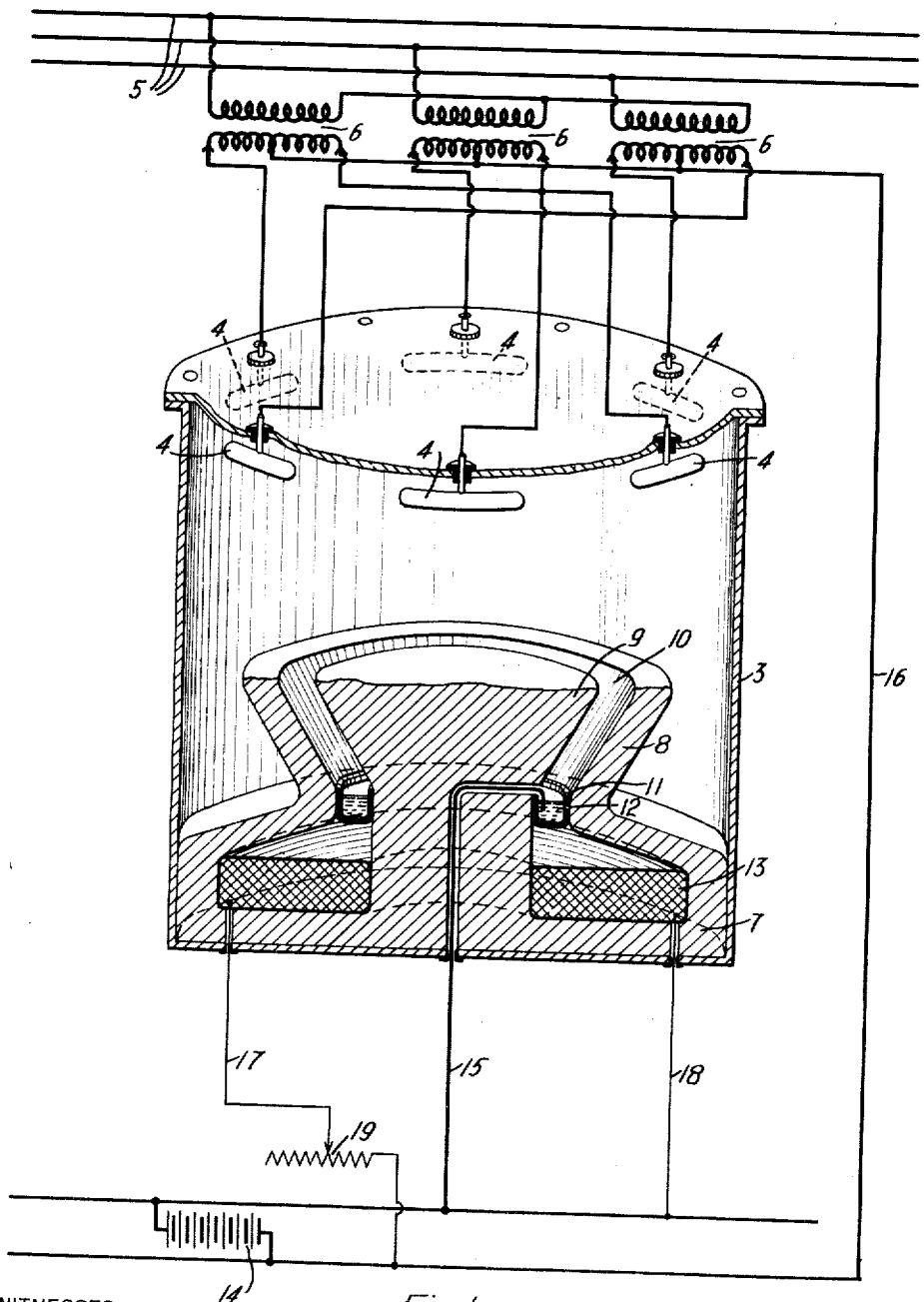
Figure 2:
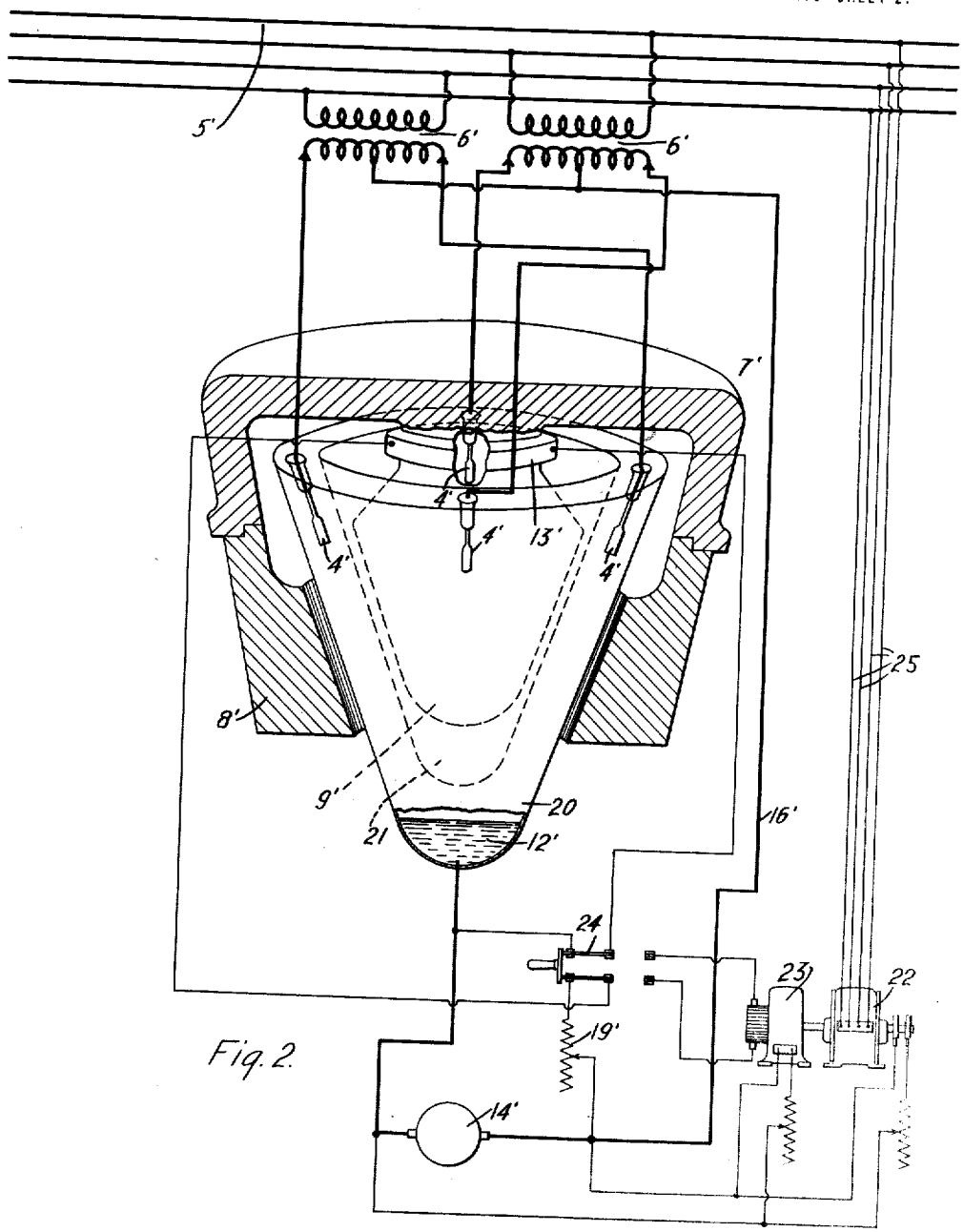

In the accompanying drawings, Figure 1 is a perspective view, partially in section, of an inverted rectifier or de-rectifier embodying one form of my invention, together with its attendant supply and consumption circuits; and Fig. 2 is a similar view of a modification of my invention, with its attendant circuits and synchronizing apparatus.

In my copending application, Serial No. 846,365, filed June 20, 1914 and assigned to the Westinghouse Electric & Manufacturing Company, I have disclosed an inverted rectifier wherein an arc is caused to sweep in succession over a plurality of electrodes by causing a magnetic flux to pass over all but one of said electrodes and to cause the void in the total resultant magnetic field to rotate at any desired speed by suitable commutating apparatus. With apparatus of the character described, the rate of rotation of the arc is under absolute control and little difficulty is experienced in establishing synchronism with a consumption circuit which it is desired to supply. By my present invention, however, I cause a radial magnetic flux to pass across in front of a ring-shaped electrode or in front of a plurality of electrodes arranged in the form of a ring and cause an arc to sweep across the electrodes by an action similar, with respect to said magnetic field, to that found in the ordinary homopolar or unipolar motor. By this means I am enabled to obtain much higher frequencies than with the apparatus described in the above-mentioned application, although somewhat greater difficulty is experienced in synchronizing with other alternating-current systems. The apparatus in itself is somewhat simpler, and frequencies of extremely high value may be obtained that may be suitable for use, for example, in wireless telephony.

It has been proposed to transform direct current into alternating current by means of a magnetically controlled vapor arc, in United States patent to Weintraub, No. 877,026, January 21, 1908. The device of this patent operates by alternately blowing out or extinguishing the arc and has been found defective for the following reason. The only electrode material which has been found suitable for power-carrying arcs of this character, is mercury or compounds thereof or hydrogen or helium when using a Wehnelt cathode. The current-carrying particles in a mercury vapor arc are of considerable mass and hence possessed of considerable inertia, and when it is attempted to reverse the direction of movement of an arc of this character, at a reasonably high rate, such, for example, as that which is attendant upon commercial frequencies, an unnecessarily large number of ampere turns must be employed to provide a very powerful controlling field before effective operation is assured. It is a well known fact that much less energy is required to move a heavy mass alternately from one point to another by causing it to revolve in a circular path which includes both of said points, rather than in causing it to reciprocate, because the sudden stoppage of a moving mass is invariably attended by a loss of energy. I avail myself of this phenomenon to provide a de-rectifying device somewhat similar to that of Weintraub, but in which the arc-bearing material, possessing considerable inherent mass, is forced to travel in a circular path and hence smooth operation is assured.

Referring to Fig. 1 of the accompanying drawings, an exhausted container 3, preferably of the metal type, is provided with a plurality of anodes 4—4 arranged to form a broken ring and insulated from the cover by suitable insulating seals, as is customary in mercury-vapor rectifiers. The anodes 4—4 are connected to polyphase mains 5 through adjustable transformers 6—6, as is customary in rectifier work. A massive core member 7 of magnetic material is disposed in the lower portion of the container 3 and embodies an upwardly extending, outwardly flaring portion 8 that encircles an inner mushroom shaped portion 9. There is formed, therefore, an outwardly flaring space 10 between the portions 8 and 9, the said space opening in the general direction of the anodes 4—4. A circular trough 11 of suitable refractory insulating material, such, for example, as porcelain or quartz, is disposed within the space 10 and contains a cathode pool 12 of mercury or other suitable material.

Beneath the trough 11, the space 12 is enlarged for the reception of a suitable exciting winding 13, which, when energized, sets up a magnetic field between the members 8 and 9 and immediately above the surface of the mercury in the pool 12. Any suitable source of direct current 14 is connected to the cathode 12 by means of a wire 15 and to the anodes 4—4 through a wire 16 and the primary windings of the transformers 6—6. Current for the excitation of the winding 13 may also be derived from the battery 14 through wires 17 and 18 and an adjustable rheostat 19. While, for clearness I have illustrated the wires 15, 17 and 18 as entering the container 3 through the bottom thereof, it will be understood by those skilled in the art that they may be introduced at any other suitable and desired location. The cathode activity of the pool 12 may be maintained by any suitable keep-alive circuits, such as are well known in the rectifier art although such means are unnecessary to the successful operation of my system.

Having thus described the structure of the device shown in Fig. 1, the operation is as follows: a discharge is initiated from the anodes 4—4 to the cathode 12 in any desired manner, and the current to supply said discharge flows through the wire 16 and the primary windings of the transformers 6—6. The discharge thus initiated will at once tend to localize upon a single anode 4 which will generally be determined by the constants of the apparatus, such, for example, as small differences in the leads or in the transformer primary windings. When once the arc has assumed a definite position within the container 3, it immediately operates as a conductor carrying current in a field, and will be urged around on the different anodes 4—4 by the flux of the winding 13 similar to the ordinary motor action or, more specifically, as in the homopolar or unipolar motor. At one instant, the arc will impinge upon a certain anode 4 causing current flow from the mid point of the corresponding transformer winding to the proper terminal thereof and, a short time later, the current flow from the diametrically opposite anode 4 will cause current flow from the mid point of the same transformer primary winding to the opposite terminal thereof. There will thus be induced pulsating currents in each half primary winding of each transformer and a resultant alternating current in the windings thereof, and the proper phase relation between the transformers 6—6 for the supply of a three-phase circuit will be assured by the relative location of the anodes 4—4. By the adjustment of the rheostat 19, the strength of the actuating magnetic field may be increased and the speed of rotation of the arc and, consequently, the frequency of the current supply to the main 5 may be adjustable.

I have found that, in an apparatus of the character described, the arc may be moved with extreme rapidity because of the fact that the controlling flux is immediately above the surface of the cathode where there is a great preponderance of electrons of relatively small mass, as compared with ions, and extremely high frequencies may therefore be produced in the mains.

Referring to the form of my invention shown in Fig. 2, a conical evacuated container 20 is provided with a conical reëntrant portion 21 and with a plurality of anodes 4'—4' connected, respectively, to the terminals of the primary windings of two transformers 6'—6', the secondary windings of which are in communication with the mains of a quarter-phase consumption circuit. A mercury cathode 12' is contained in the lower portion of the container 20 and is connected to one terminal of a source of direct current 14', the other terminal of which is connected to the mid-point of the primary windings of the transformers 6'—6' by a suitable wire 16'. A magnet structure 7' embraces the upper portion of the container 20 and comprises an inner cone shaped portion 9' extending within the space 21 and a downwardly and inwardly extending flange 8'. The member 7' is suitably magnetized by a winding 13' excited from the source 14' through an adjustable rheostat 19'.

The operation of the device, as set forth to this point, is, in many respects, similar to that of the device shown in Fig. 1. An arc between the anodes 4' and the cathodes 12' is caused to rotate by the magnetic flux between the members 8' and 9' and thus to impinge in succession upon each of the anodes 4', producing pulsating currents in the primary windings of the transformers 6'—6' and alternating current in the secondary windings thereof for the supply to the consumption mains 5'.

If, as is frequently the case, it be desired to supply energy to mains 5' which are already receiving alternating-current energy from other sources, such, for example, as alternating-current dynamos, it becomes necessary to employ suitable synchronizing and frequency-controlling apparatus. I, therefore, connect a synchronous motor 22 to the mains 5' by suitable leads 25 and cause said motor to drive a direct-current generator 23 which, in turn, may be connected to energize the winding 13' by throwing a suitable double-throw switch 24 to the right. With these connections, an increase in the frequency of the mains 5' will cause an increase in the speed of the motor 22 and a resultant increase in the voltage of the generator 23 and, by the choice of a generator having a suitable rising speed-voltage characteristic, this increased voltage may be made sufficient to strengthen the field 13' to such an extent as to cause the speed of the rotating arc to rise sufficiently to cause the current output of the entire device to have the same frequency as that on the mains 5'. Obviously, the converse operation will take place and, hence, synchronism may be maintained throughout a considerable range of changes in the line frequency.

When it is desired to employ my de-rectifier for extremely high frequencies it is preferable to employ cathode materials of smaller molecular weight than mercury in order to reduce the inertia of the moving arc. In some cases, it is necessary to provide an arc composed almost entirely of electrons as distinguished from the ions of the ordinary vapor discharge and it is therefore necessary to employ heated cathodes of the well known Wehnelt type. For high-frequency work, I find it also desirable to employ electrostatic arc control, as described in my above noted application.

While I have illustrated my invention in several embodiments thereof, it will be understood by those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. The combination with an evacuated container, of a plurality of anodes and a liquid reconstructing cathode therein, means for maintaining a direct-current arc between said anodes and said cathode, and means for producing a magnetic field of fixed strength and direction tending to rotate said arc so that it operates in succession from each of said anodes.

2. The combination with a plurality of anodes arranged to form a ring, of a cathode adjacent thereto, means for maintaining a unidirectional arc therebetween, and a fixed magnetic field for rotating said arc, whereby it operates in succession from each of said anodes.

3. The combination with a group of electrodes of one polarity, of an electrode of the opposite polarity mounted adjacent thereto, means for maintaining a unidirectional arc between said last named electrode and said group of electrodes, and means for producing a fixed radial magnetic field in the space between said electrodes, whereby said arc is caused to revolve and operate in succession on each electrode in said group.

4. The combination with a group of anodes, of a cathode, a source of direct current, a connection from one terminal of said source to each of said anodes, a connection from the other terminal of said source to said cathode, a transformer associated with each of said anodes and having its primary winding inserted in the connection thereto, and means for producing a fixed magnetic field for causing an arc between said electrodes to be rotated, whereby it is caused to operate in succession on each of said anodes, causing pulsating current in the primary windings of said transformer and alternating current in the secondary windings thereof.

5. The combination with an evacuated container, of a plurality of anodes mounted therein and arranged in a ring, a single ring-shaped cathode adjacent to said anodes, a source of direct current connected to said electrodes, and means for maintaining a radial flux across the surface of said ring-shaped cathode, whereby an arc between said electrodes is caused to rotate and operate in succession on each of said anodes, and means for transforming the energy of the pulsating current flow to said anodes into alternating current.

6. The combination with an evacuated container, of a plurality of anodes and a liquid reconstructing cathode therein, means for maintaining a direct-current arc between said anodes and said cathode, and means for producing a fixed magnetic field adjacent said cathode and tending to rotate said arc so that it operates in succession from each of said anodes.

7. The combination with an evacuated container, of a plurality of anodes and a liquid reconstructing cathode therein, means for maintaining a direct-current arc between said anodes and said cathode, and means for producing a fixed magnetic field intersecting said arc at portions thereof composed principally of electrons and tending to rotate said arc so that it operates in succession from each of said anodes.

In testimony whereof, I have hereunto subscribed my name this 12th day of March, 1915.

FRIEDRICH W. MEYER.

Witnesses:
D. C. DAVIS,
B. B. HINES.